G. ROGERS.

TRACTION-ENGINE.

No. 7,736. Reissued June 12, 1877.

Witnesses:
D. T. Cowl
L. Bacon

Inventor:
George Rogers
by atty W. Bailey

HUNTERS, PHOTO-LITHOGRAPHER, WASHINGTON, D. C.

UNITED STATES PATENT OFFICE.

GEORGE ROGERS, OF MOUNT VERNON, OHIO.

IMPROVEMENT IN TRACTION-ENGINES.

Specification forming part of Letters Patent No. 173,498, dated February 15, 1876; reissue No. 7,736, dated June 12, 1877; application filed May 23, 1877.

*To all whom it may concern:*

Be it known that I, GEORGE ROGERS, of Mount Vernon, in the county of Knox and State of Ohio, have invented certain new and useful Improvements in Traction-Engines; and I do hereby declare that the following is a full, clear, and exact description thereof, that will enable others skilled in the art to which it appertains to make and use the same, reference being had to the accompanying drawings, and to the letters of reference marked thereon, which form a part of this specification.

My invention relates to an improvement in traction-engines.

Figure 1:
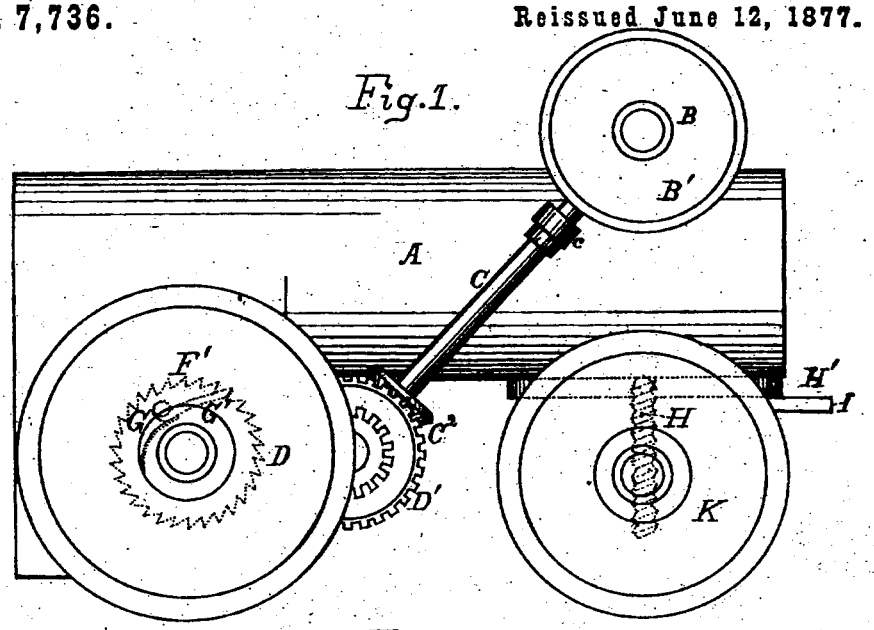
Figure 2:
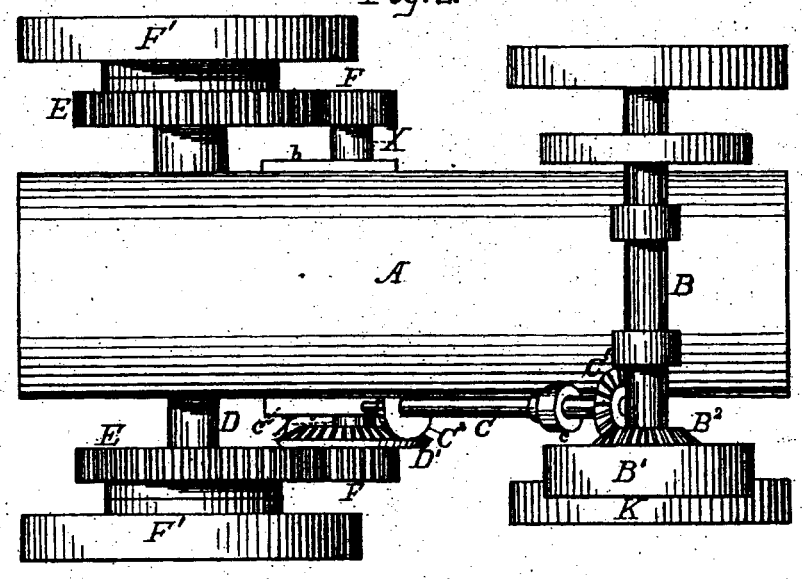

In the drawing, Figure 1 is a side elevation of so much of a traction-engine as needed to illustrate my invention. Fig. 2 is a plan of the same.

A is the boiler of the engine, and B is the driving-shaft, to which power is applied from the engine-cylinder. The boiler is supported at its rear by truck-wheels F′, and at its front by truck-wheels K. The truck-wheels F′ are mounted upon a shaft, D, which may be either continuous or divided—that is to say, each wheel may have its own axle, or one axle may serve for both. In either case, however, there is practically but one axle, which I shall term the "rear axle," constituting the axis of revolution of the wheels F′. The truck-wheels F′ are rotated by means of gear-wheels E, which have the rear axle as their axis, and mesh with pinions or cog-wheels F fixed on a shaft, X, which I term the "supplemental shaft," revolving in suitable bearings or boxes *c′ b*, carried by the boiler. The supplemental shaft derives its motion from the driving-shaft B through the intermediary of the shaft C, which I shall term the "connecting-shaft." This connecting-shaft, supported in suitable bearings *c c′*, engages at one end the driving-shaft and at the other end the supplemental shaft. The engagement is effected, in the present instance, by means of beveled gearing $B^2$ $C^1$ $C^2$ D′, as shown.

When the wheels F′ and E are made and mounted on their axle separately, any suitable arrangement—such as the pawl and ratchet G G′, applied the one to the gear E and the other to the truck-wheel F′—will cause the truck-wheels to be driven by the gear, and yet admit of the independent movement or revolution of the truck-wheels whenever this becomes necessary—as, for instance, in turning the machine to the right or left. In the present case the pawls and ratchets are in the housings of the wheels F′ E, and these wheels revolve freely on their axle.

H is a screw passing from the boiler down through the front truck or axle, answering not only as a king-bolt, but also as a lifting-jack, by means of the nut-wheel H′, mounted on the screw between the boiler and the front axle or truck, and resting on the latter. By turning the nut-wheel in one direction or the other the front end of the boiler will be raised from or lowered toward the front axle. When the boiler is so actuated it moves upon the rear axle as its axis. The pinions F of the supplemental shaft (which participates in this movement of the boiler) therefore move in the arc of a corresponding circle, and, consequently, preserve their engagement with the gears E.

I is a tongue or pole for attachment of horses, oxen, &c., for the purpose not only of assisting in the draft, but likewise of steering or guiding the machine.

The feature of adjusting the elevation of the front end of the boiler is for the purpose of maintaining, as nearly as possible, the level position of the boiler in traveling upon an inclined road, so as to insure safety by having the crown-sheet and flues at all times properly covered with water.

The invention herein described is especially adapted to portable engines now so extensively used for farming purposes, and for sawing timber in various places. It has heretofore been found more or less difficult, especially during inclement seasons, to convey the so-called portable engines from place to place. This invention is intended to obviate, to a great extent at least, this difficulty and objection, and its character is such as to render it easily adaptable to portable engines already in use, and not provided with any power of self-locomotion.

Having described my invention, what I claim, and desire to secure by Letters Patent, is—

1. The combination of the driving-shaft and the rear axle, having truck-wheels adapted to be loosely or rigidly secured to it, with the supplemental shaft, provided with cog-wheels, gearing with wheels on the rear axle, and the intermediate connecting-shaft, engaging at one end the driving-shaft and at the other end the supplemental shaft, as herein shown and set forth.

2. In a traction-engine, a boiler supported so as to be capable of oscillatory movement upon its power-driven axle as an axis, and means for so moving said boiler, in combination with a rotary supplemental shaft, which derives its rotary movement from the driving-shaft of the engine, is carried by and partakes of the movement of the boiler, and gears with wheels on said axle, substantially as shown and set forth.

In testimony that I claim the foregoing I have hereunto set my hand this 21st day of May, 1877.

GEO. ROGERS.

Witnesses:
H. H. GREER,
JOS. C. DEVIER.